United States Patent
Lee

[11] Patent Number: 5,848,637
[45] Date of Patent: Dec. 15, 1998

[54] QUICK DEFROSTING PAD

[76] Inventor: Richard Lee, 10F, No. 525 Chung-Cheng Rd., Hsintien, Taipei Hsien, Taiwan

[21] Appl. No.: 848,219
[22] Filed: Apr. 29, 1997
[51] Int. Cl.$^6$ .................................................. E21B 43/00
[52] U.S. Cl. .......................... 165/104.21; 62/371; 99/483
[58] Field of Search ...................... 62/272, 371, 457.9, 62/DIG. 22; 165/104.19, 104.21, 104.22, 104.26; 99/483

[56] References Cited

U.S. PATENT DOCUMENTS

| | | | |
|---|---|---|---|
| 2,835,480 | 5/1958 | Perez | 165/104.21 |
| 2,915,296 | 12/1959 | Johnson | 165/104.21 |
| 3,379,118 | 4/1968 | Perez | 165/104.21 |
| 4,602,679 | 7/1986 | Edelstein et al. | 165/104.26 |
| 5,201,364 | 4/1993 | Tippmann | 165/26 |
| 5,253,702 | 10/1993 | Davidson et al. | 165/80.4 |
| 5,368,093 | 11/1994 | Takehashi | 165/46 |
| 5,660,229 | 8/1997 | Lee et al. | 165/104.26 |

*Primary Examiner*—William Doerrler
*Attorney, Agent, or Firm*—Rosenberg, Klein & Bilker

[57] ABSTRACT

A quick defrosting pad comprising a pad body and a plurality of heat pipes is provided. The pad body is made from a material with excellent heat conductivity. The bottom of the pad body is provided with a plurality of projecting ribs or posts. The heat pipes are made from a material with excellent heat conductivity and which can be integrally formed with the pad body or be assembled to the pad body after it is individually formed. Each of the pipes is sealed at both ends and evacuated to form a vacuum condition therein. The inner wall of the tube is provided with a metal mesh having a siphon effect. The inner space of the pipe is injected with a suitable amount of a working fluid which is volatile. The plurality of pipes are respectively disposed in each of the projecting ribs or posts of the pad body, such being spaced one from another.

1 Claim, 3 Drawing Sheets

QUICK DEFROSTING PAD

FIELD OF THE INVENTION

The present invention relates to a quick defrosting pad, more particularly, to a quick defrosting pad for frozen food, such as fish, meat etc.. The frozen can be quickly defrosted.

DESCRIPTION OF PRIOR ART

When a frozen food, such as fish and meat, is to be cooked, it shall firstly have it been defrosted as it is removed from the refrigerator. Normally, the frozen food can be naturally defrosted as the frozen food is disposed under the room temperature. However, this takes a quite long time to get the food completely defrosted. This is really inconvenient to the cooker. Taking and wasting a long period for defrosting is not economic especially the time is precious for modern people. Even right now the microwave oven can be used to defrost a frozen food, however, the timing can not be accurately controlled. For a prolonged defrosting process performed by the microwave oven, the food can be pre-cooked which is not desirable. Furthermore, defrosting through a microwave oven consume a great deal of power.

In light of this, there is still a room for improvement on the defrosting process for the frozen food.

SUMMARY OF THE INVENTION

It is the objective of this invention to provide a quick defrosting pad wherein the frozen food can be readily defrosted through a plurality of heapel pipes without external power. By the provision of the heapel pipes, the room temperature can be readily and uniformly transferred and distributed to the frozen fish and meat such that the frozen fish and meat can be readily defrosted.

In order to achieve the object set forth, the quick defrosting pad made according to the present invention generally comprises a pad body and a plurality of heapel pipes. The pad body is made from material with excellent heat conductivity. The bottom of the pad body is provided with a plurality of projecting ribs or posts. The heapel pipes are made from material with excellent heat conductivity and which can be integrally formed with the pad body or be assembled to the pad body after it is individually formed. Each of the pipes is sealed at both end and sucked to a vacuum condition therein. The inner wall of the tube is provided with a metal mesh having siphon effect thereof. The inner space of the pipe is injected with suitable amount of working fluid which is volatile. The pipe is disposed to each of the projecting ribs or posts of the pad body and is spaced from each other. The frozen fish or meat can be disposed onto the top surface of the pad body. The bottom of the pipes will be heated by the room temperature such that the working fluid is vaporized. When the rising vapors reached the top of the pipes, the vapor conducts a heat exchange such that the vapors are condensed and the top of the pipe as well as the pad is heated. Accordingly, the frozen food disposed above the pad body is heated to defrost. On the other hand, the condensed droplets flow down along the metal mesh disposed at inner wall of the tube. Once the droplet reach the bottom, it is vaporized again as heated by the room temperature, a cycle resumes again. In light of this, the frozen food can be quickly defrosted by the repetitive heat exchange conducted by working fluid disposed within the heapel pipes. No additional or external power is required.

BRIEF DESCRIPTION OF DRAWINGS

In order that the present invention may more readily be understood the following description is given, merely by way of example with reference to the accompanying drawings, in which.

BRIEF DESCRIPTION OF NUMERALS

| 10 pad body | 11 projecting ribs |
| --- | --- |
| 12 groove | |
| 20 heapel pipes | 21 metal mesh |
| 22 working fluid | |
| 30 frozen food | |

DETAILED DESCRIPTION OF PREFERRED EMBODIMENT

Figure 1:
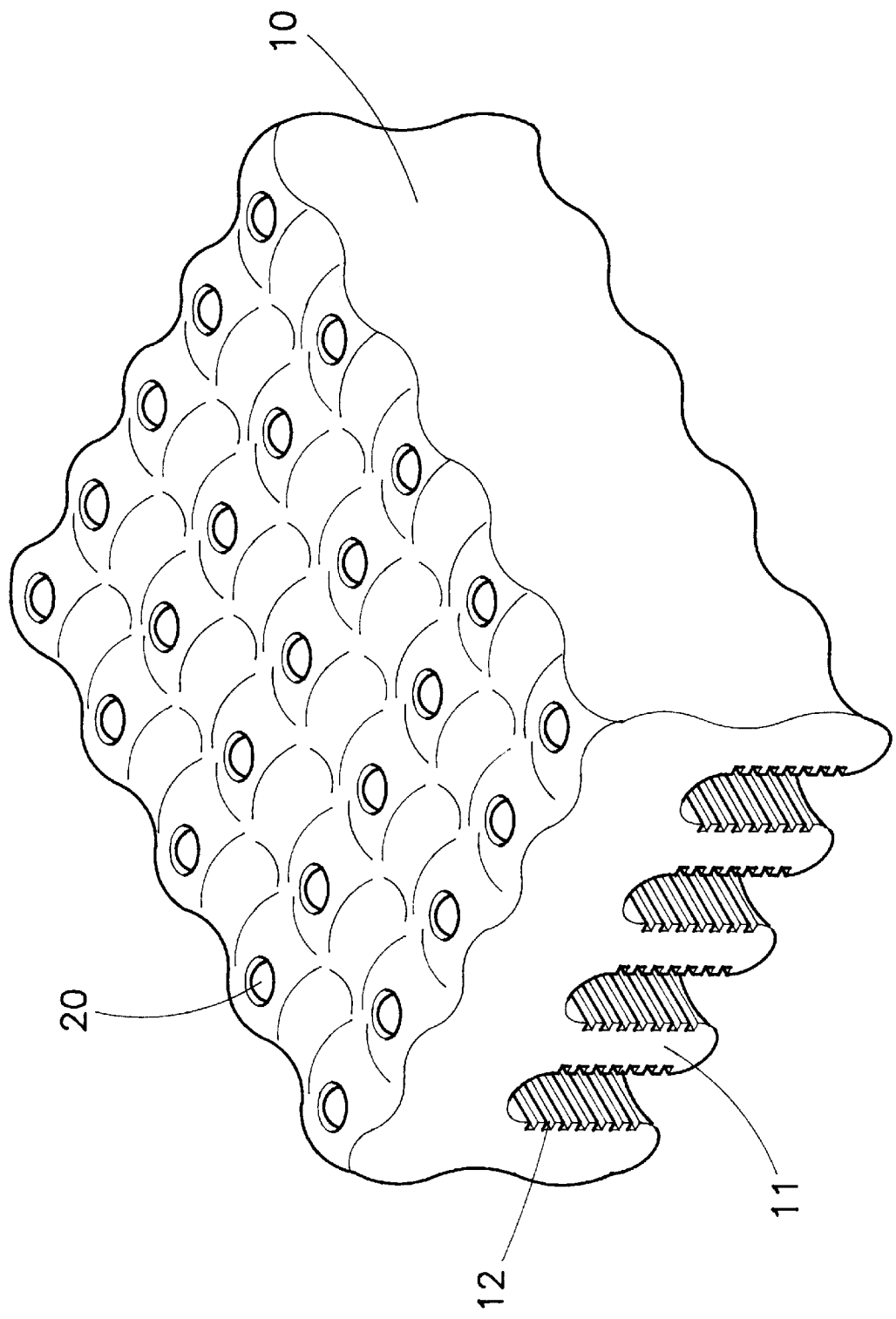
FIG. 1 is a perspective view of the defrosting pad made according to the present invention.
Figure 2:
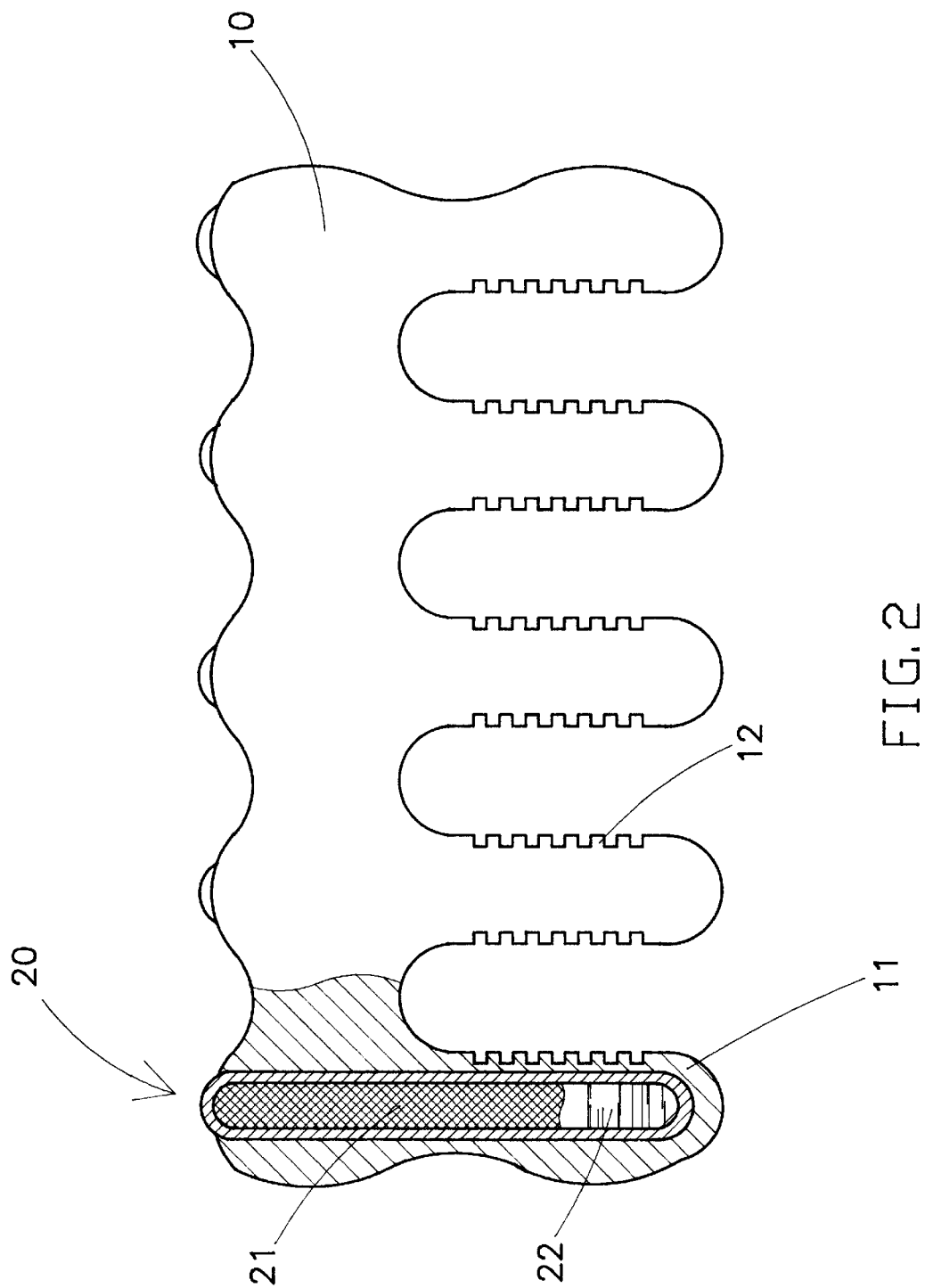
FIG. 2 is a cross sectional view of the defrosting pad shown in FIG. 1.

Referring to FIGS. 1 and 2, a perspective and cross sectional views of the defrosting pad are respectively shown. The defrosting pad includes a pad body 10 and a plurality of heapel pipes 20. The pad body 10 is made from material with excellent heat conductivity. The bottom of the pad body 10 is extended with a plurality of projecting ribs or posts 11. Each of the projecting ribs or post 11 is received and retained with a heapel pipe 20 such that the top of pipe 20 is projected a little over the top surface of the pad body 10. The outer and/or side surface of the pad body 10 can be formed in wave form to increase the overall contacting area. The projecting ribs or posts 11 are also provided with a plurality of grooves 12 at outer surface for increasing heat conductivity.

The heapel pipes 20 are made from material with excellent heat conductivity having suitable length and hollow configuration. This heapel pipes 20 can be integrally formed with the pad body 10 or be made individually firstly and then assembled to the pad body 10. The pipes 20 are firstly sealed at both ends and then are sucked to form a vacuum condition within the pipes 20. Each of the pipes 20 are also provided with a metal mesh 21 having siphon effect along its inner wall. This metal mesh 21 can also be replaced by a steel wires or tiny grooves. Each of the pipes 20 is also injected with suitable amount of working fluid 22 which is volatile. Each of heapel pipes 20 are disposed within the projecting ribs or posts 11 which are spaced from each other. The top of the heapel pipes 20 are projected above the upper surface of the pad body 10.

Figure 3:
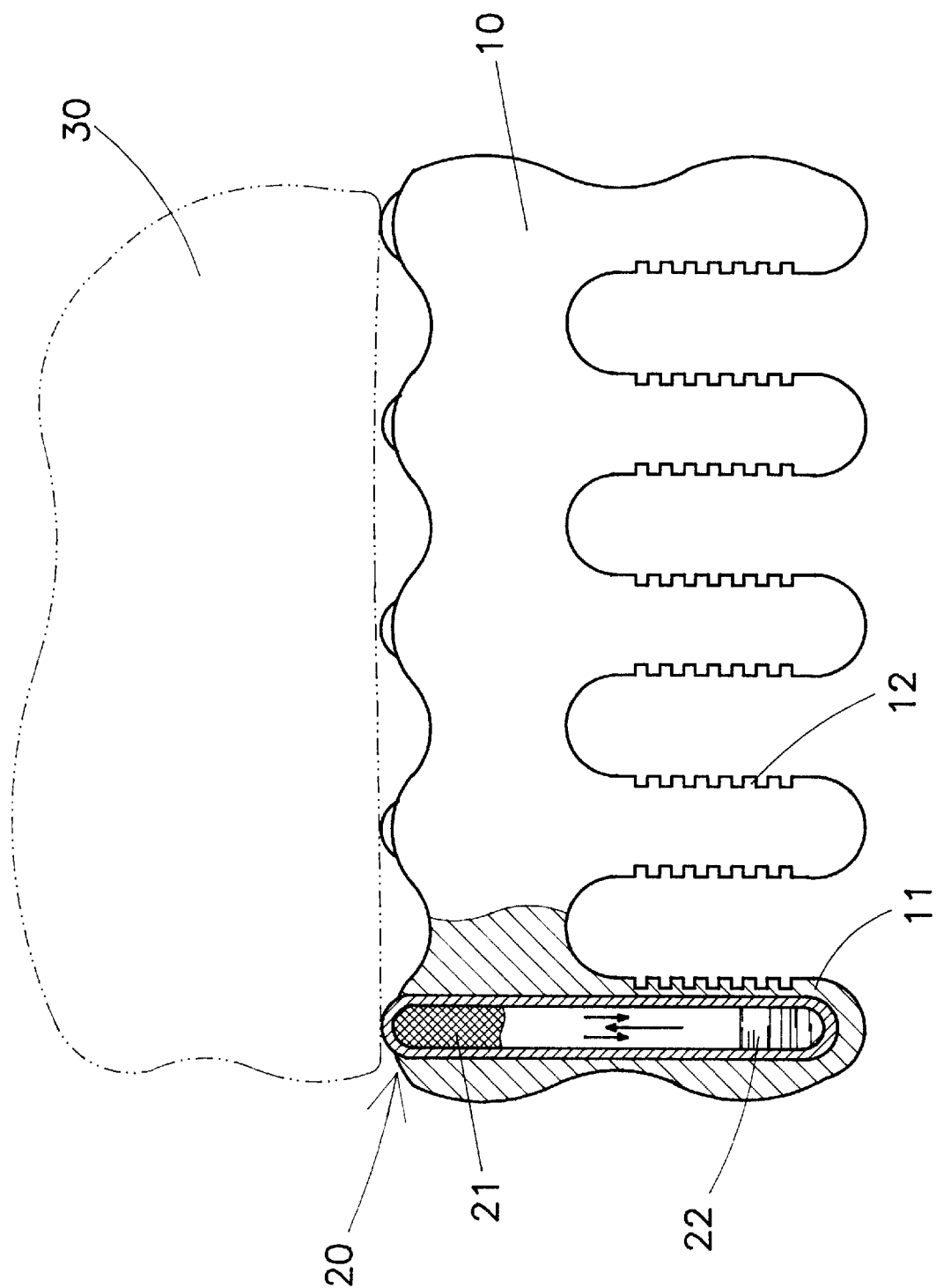
FIG. 3 is a schematic illustration showing the application of the defrosting pad.

Referring to FIG. 3, a schematic illustration for the application of the present invention is shown. In use, the frozen food 30, such as a frozen fish and/or meat, can be disposed above the upper surface of the pad body 10. In this situation, the working fluid 22 within the pipes 20 conduct a heat exchange with the room temperature such that the working fluid 22 is vaporized. The heated vapors are then risen to the top of the pipes 20 and conduct also a heat exchange at top of the pipes 20. Accordingly, the top of the pipes 20 and upper surface of pad body 10 are heated while the vapors are condensed. While the upper surface of pad body 10 is heated, the frozen food disposed thereof will be defrosted with the heat exchanged from the vapors. On the other hand, the condensed droplets flow down along the metal mesh 21 along the inner wall of the pipes 20 and return to the bottom of the pipes 20 again. Then these droplet of working fluid 22 will be vaporized again to conduct a cycle, i.e. vaporized, heat exchanging, condensed, and vaporized . . . . In light of this, the frozen food is defrosted quickly without the additional and external supplied power.

Once the working fluid 22 is heated and vaporized, the heated working fluid 22 transforms into vapors immediately and the heat is transformed with sub-sonic speed. This happens very quickly. Since the vapors are firstly condensed at the lowest portion within the pipes 20 which are made from material with excellent heat conductivity. In light of this, the heat distribution is quite excellent. Most important, the heat exchange is performed under room temperature without any additional or external power.

From the forgoing description, it can be readily appreciated that the frozen food can be readily and quickly defrosted under the room conditions without wasting and taking a great deal of precious time. The disadvantages of overheated or consuming power are completely solved.

While particular embodiment of the present invention has been illustrated and described, it would be obvious to those skilled in the art that various other changes and modifications can be made without departing from the spirit and scope of the invention. It is therefore intended to cover in the appended claims all such changes and modifications that are within the scope of the present invention.

I claim:

1. A defrosting pad, comprising:

a one-piece pad body formed of a material having a high thermal conductivity, said pad body having an upper portion and a lower portion, said upper portion having a top surface with an undulating contour to increase a contact surface area with a frozen food product received thereon, said lower portion of said pad body having a plurality of downwardly directed ribs, each displaced from the other, each of said ribs having a plurality of grooves formed in an external surface thereof to increase a thermal exchange surface area thereof and a plurality of internal cavities formed therein, said pad body having a plurality of spaced openings formed therein, each of said plurality of openings being formed through said upper portion in open communication with a respective internal cavity of a respective rib; and, a plurality of heat pipes respectively disposed in said plurality of openings in said pad body in a substantially vertical orientation, each of said plurality of heat pipes having (a) a lower end disposed in a respective internal cavity of a respective rib for transfer of heat from ambient air thereto, and (b) an upper end extending through said opening and spaced above said upper surface of said pad body for direct contact with a frozen food product to transfer said heat thereto.

* * * * *